Figure 1:
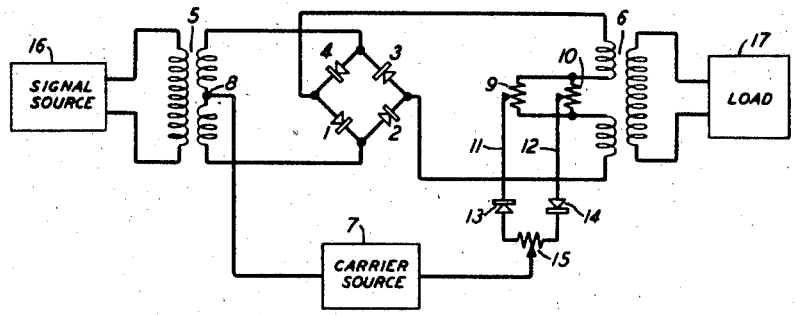

Dec. 7, 1948.  H. T. CARTER  2,455,732
DOUBLE BALANCED MODULATOR
Filed Sept. 5, 1947

INVENTOR
H. T. CARTER
BY
N. D. Ewing
ATTORNEY

Patented Dec. 7, 1948

2,455,732

UNITED STATES PATENT OFFICE 2,455,732

DOUBLE BALANCED MODULATOR

Herman T. Carter, Madison, N. J., assignor to Bell Telephone Laboratories, Incorporated, New York, N. Y., a corporation of New York Application September 5, 1947, Serial No. 772,335

19 Claims. (Cl. 179—171.5)

This invention relates primarily to wave translating systems employing rectifying elements, and more particularly to balanced modulators.

One object of this invention is to permit independent control of the relative current received by the various branches of a circuit containing rectifying elements.

Another and more particular object is to reduce the transmission of an unmodulated carrier component, i. e., "carrier leak," caused by unbalance in a so-called balanced type of modulator.

A further object is to reduce the transmission of a signal component caused by lack of balance between the two halves of a so-called balanced type of modulator.

In accordance with a feature of the present invention, the current through any group of similarly poled rectifying elements is controlled by means of a circuit containing an auxiliary rectifier poled in the same direction as the rectifying elements to be regulated. A device to regulate the amount of current entering the auxiliary rectifier circuit is also included. In this manner the half-cycles of current passing through all similarly poled rectifying elements can be controlled independently of those half-cycles passing through elements of opposite polarity.

In accordance with a further feature of the invention, means is employed to vary the relative current received by each individual rectifying element from the auxiliary rectifier circuit mentioned above. Thus, control is extended to include regulation of the half-cycles of current passing through any rectifying element in the circuit which is poled in the same direction as the auxiliary rectifier to which it is connected.

A specific embodiment of the invention comprises a balanced modulator circuit which includes a bridge of at least four rectifying elements disposed in respective arms thereof, a carrier current source, and an additional pair of oppositely poled rectifiers connected in parallel between the carrier supply and two terminals of the bridge circuit. Any given bridge rectifier passes only alternate half-cycles of the carrier current, and this portion of the carrier current is supplied through substantially only one of the two additional oppositely poled rectifiers. By regulating the relative current so received by each member of any pair of similarly poled bridge elements, the balance of the modulator circuit may be substantially increased, thus causing a corresponding decrease in "carrier leak" and transmitted signal.

The invention will be more clearly understood from the following detailed description and the accompanying drawings, in which:

Fig. 1 represents a specific embodiment of the invention in a balanced modulator circuit; and Figs. 2, 3, 4 and 5 represent a few variations to which the invention may be applied.

Referring particularly to Fig. 1, the balanced modulator circuit shown is of a well-known type, with new means for adjusting and balancing the system. The basic modulator circuit is described in United States Patent No. 2,025,158, issued December 24, 1935, to F. A. Cowan, and comprises a bridge of four rectifying elements 1, 2, 3 and 4 disposed in respective arms thereof, the rectifying elements being poled to conduct current primarily in one direction around the closed loop of the bridge. As in the Cowan circuit, transformers 5 and 6 are employed for signal input and modulated wave output, respectively. A source of carrier current 7 is also provided. The secondary winding of the input transformer 5 is connected between any pair of non-adjacent terminals of the rectifier bridge and it is tapped at an intermediate point 8 to permit attachment of a connection to one side of the carrier source 7. The primary winding of the output transformer 6 is connected between the other pair of bridge terminals and it is divided in a somewhat similar manner to permit attachment of a connection from an intermediate point to the other side of the carrier source 7.

Ideally, a completely modulated wave, with carrier and signal components suppressed, is produced in the secondary winding of the output transformer 6 when current from a signal source 16 is introduced into the primary winding of the input transformer 5, provided that current from the carrier source 7 is flowing in the circuit at the same time. In such a case, no unmodulated carrier or signal reaches the load 17 which is connected to the secondary winding of the output transformer 6. However, such an ideal situation is possible only if the circuit is accurately balanced. Unbalance permits the transmission of an unmodulated carrier component, known as "carrier leak," and a signal component, thus defeating the purpose of the balanced feature of the basic circuit. Hence, it is highly advantageous to have some means for regulating the relative current flowing in various parts of the modulator circuit, thus enabling a much higher degree of balance to be obtained. The input and output transformer coils should be balanced, and external networks may be added to improve such coil balance if necessary.

The embodiment of the present invention shown in Fig. 1 includes two voltage dividers 9 and 10, the resistance elements of the voltage dividers being connected in parallel with each other between the two divisions of the primary winding of the output transformer 6. Two carrier connections 11 and 12, connected to the adjustable contacts of voltage dividers 9 and 10, respectively, serve to carry current from the carrier source 7 through voltage dividers 9 and 10 to the divided primary windings of said output transformer 6. Two oppositely poled auxiliary rectifiers 13 and 14 are included in carrier connections 11 and 12, respectively, with the result that connection 11 and voltage divider 9 carry predominantly the half-cycles of carrier current flowing in one direction and connection 12 and voltage divider 10 carry predominantly the half-cycles of carrier current flowing in the opposite direction. A third voltage divider 15 is connected with its resistance element connected between carrier connections 11 and 12 and with its adjustable contact connected to the carrier source 7.

The operation of the invention in its above application is as follows. Assuming perfect rectification for the moment, all current flowing through one of the carrier connections, 11 for instance, and its included rectifier 13, must flow through the pair of bridge rectifying elements 1 and 3 which are poled to receive this rectified current from the divided primary winding of output transformer 6. Adjustment of the appropriate voltage divider 9 then determines the relative current flowing in the bridge elements 1 and 3. Equalization of such currents results in balance. The same procedure is used to balance the other pair of bridge rectifying elements 2 and 4, except that carrier connection 12, rectifier 14, and voltage divider 10 are used. The two halves of the bridge circuit may thus be balanced independently. The third voltage divider 15 may then be used to vary the relative strength of the currents admitted to carrier connections 11 and 12, and to balance thereby, one pair of bridge rectifiers against the other, achieving over-all balance in the modulator. The third voltage divider 15 is not necessary for balancing against "carrier leak," but balances the two halves of the modulated output against each other, thus balancing out any transmitted signal.

Though perfect rectification is desirable it is not necessary. Since most rectifiers are merely asymmetrically conducting elements, i. e., elements that conduct current better in one direction than in the other, perfect or near perfect rectification is not always obtainable. The invention may be used to advantage in circuits employing various kinds of unilaterally conducting devices. Better rectifiers enable a higher degree of balance to be obtained with fewer adjustments.

Similarly, the invention is particularly applicable to circuits employing rectifiers with low shunt capacitances, e. g., point contact crystal type rectifiers. The feature of low shunt capacitances enables a high degree of balance to be obtained by adjustments made on a magnitude basis only instead of a combination of both magnitude and phase. The invention is not limited to circuits employing such rectifiers, though its advantages are greatest with such use.

Figure 2:
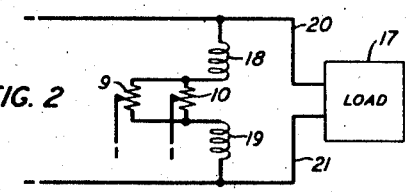
Figure 3:
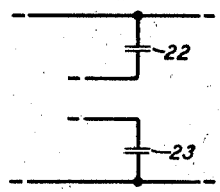
Figure 4:
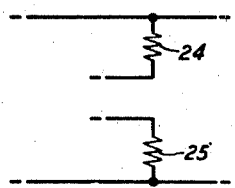

Variations of the circuit illustrated above to which this invention may be applied are shown in Figs. 2, 3 and 4. Fig. 2 represents a circuit employing inductance coils 18 and 19 and direct output connections 20 and 21 instead of an output transformer 6. The coils may be either separate or inductively coupled. One inductance coil 18 has one end connected to a terminal of the bridge circuit, while the other inductance 19 has one end connected to the terminal in the opposite corner of the bridge circuit. The two remaining ends of inductance coils 18 and 19 are available for connection to the carrier source 7.

The remainder of the connections are much the same as those shown in Fig. 1, except that a similar inductance coil combination may be used instead of the input transformer 5. The present invention, as applied to this circuit, comprises the same system of voltage dividers and rectifiers shown in Fig. 1. The connections are similar, except that the resistance elements of voltage dividers 9 and 10 are connected in parallel between the carrier side terminals of inductance coils 18 and 19. The operation of this embodiment of the invention is somewhat similar to that described in the previous example.

Fig. 3 represents a variation of Fig. 2, with capacitances 22 and 23 substituted for inductances 18 and 19. In Fig. 4, resistances 24 and 25 are used for the same purposes. In either variation, the present invention is applied in the manner described in the foregoing example. The operation is similar in all instances and may be used in the input circuit as well as in the output circuit.

Figure 5:
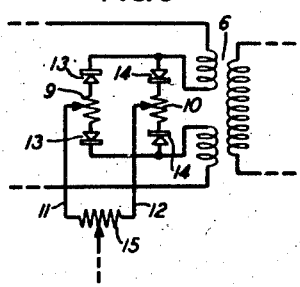

A further embodiment of the invention is shown in Fig. 5. A pair of similarly poled rectifiers 13 perform the function of the single rectifier 13 in the carrier connection 11 shown in Fig. 1. In this embodiment, one of these rectifying elements 13 is connected between one end of the resistance element of voltage divider 9 and one portion of the divided primary winding of the output transformer 6. The other rectifier 13 is connected between the other end of the resistance element of voltage divider 9 and the other portion of the divided primary winding of the output transformer 6. A somewhat similar arrangement is used in carrier connection 12. The operation of this embodiment is similar to the operation of that shown in Fig. 1. Likewise, it is applicable to the various systems shown in Figs. 2, 3, and 4. Here, each rectifier 13 carries only approximately half the current that would be carried by the single rectifier 13 of the previous embodiment.

Although the invention has been described largely with reference to certain specific embodiments, it is susceptible of application in various other embodiments within the spirit and scope of the appended claims.

What is claimed is:

1. In combination, a bridge circuit comprising at least four asymmetrically conducting elements disposed in respective arms thereof, a source of alternating current, a first divided connection from one side of said source to one pair of terminals of said bridge circuit, a pair of additional oppositely poled asymmetrically conducting elements, a second divided connection from the other side of said source to one side of each of said additional asymmetrically conducting elements, and connections from each of the other pair of bridge terminals to the other sides of both of said additional asymmetrically conducting elements, one pair of said bridge elements being poled to receive current predominantly from one of said additional asymmetrically conducting elements, and the other pair of said bridge elements being poled in the opposite direction to receive current predominantly from the other of said additional asymmetrically conducting elements.

2. A combination, according to claim 1, including means for regulating the relative current received by the respective members of at least one of said pairs of bridge elements.

3. A combination, according to claim 1, including means for regulating the relative current received by the respective members of both of said pairs of bridge elements.

4. A combination, according to claim 1, including means for regulating the relative current received from said source by said respective additional asymmetrically conducting elements.

5. In combination, a bridge circuit comprising at least four unilaterally conducting elements disposed in respective arms thereof, said elements being poled to form a continuous current path in one direction around said bridge circuit, a source of alternating current, and circuit means connecting said source to said bridge circuit, said circuit means including, between at least one side of said source and said bridge circuit, a pair of circuit branches which contain additional oppositely poled unilaterally conducting elements.

6. A combination according to claim 5 including means for regulating the relative current received by at least two of said bridge unilaterally conducting elements and means for regulating the relative current received by said respective circuit branches containing said additional oppositely poled unilaterally conducting elements.

7. A combination according to claim 5 including means for regulating the relative current received by each of said bridge unilaterally conducting elements and means for regulating the relative current received by said respective circuit branches containing said additional oppositely poled unilaterally conducting means.

8. In combination, a bridge circuit comprising at least four asymmetrically conducting elements disposed in respective arms thereof, a source of alternating current, and two distinct connections from said source to said bridge circuit, at least one of said connections including unilaterally conducting means, one pair of said bridge elements being poled to receive current from the connection including said unilaterally conducting means, and the other pair of said bridge elements being poled in the opposite direction.

9. In a balanced modulator circuit, a bridge comprising at least four rectifying elements disposed in respective arms thereof, a carrier wave source, input and output transformers having one winding each that is divided to provide connections from an intermediate point to said carrier wave source, each of said windings being connected to said bridge, and means for balancing any pair of said bridge rectifying elements, comprising at least two additional oppositely poled rectifiers and a pair of voltage dividers, said voltage dividers being connected in parallel between the two winding divisions of one of said transformers, and each of said voltage dividers being connected to receive carrier current through one of said oppositely poled rectifiers.

10. In a balanced modulator circuit, in accordance with claim 9, an additional voltage divider, connected so that said additional oppositely poled rectifiers receive carrier current from said source through said additional voltage divider.

11. In a balanced modulator circuit, a bridge comprising at least four rectifying elements disposed in respective arms thereof, a carrier wave source, input and output terminals, connections from said terminals to said bridge, two pairs of substantially equal series impedances connected, respectively, across said input and output terminals, and means for balancing any pair of said bridge rectifying elements, comprising at least two additional oppositely poled rectifiers and a pair of voltage dividers, said voltage dividers being connected in parallel between the two impedances of one of said pairs of substantially equal series impedances, and each of said voltage dividers being connected to receive carrier current through one of said additional oppositely poled rectifiers.

12. In a balanced modulator circuit, in accordance with claim 11, an additional voltage divider, connected so that said additional oppositely poled rectifiers receive carrier current from said source through said additional voltage divider.

13. A balanced modulator circuit, according to claim 11 with the impedance elements of at least one of said pairs of substantially equal series impedances comprising inductance coils.

14. A balanced modulator circuit, according to claim 11, with the impedance elements of at least one of said pairs of substantially equal series impedances comprising capacitances.

15. A balanced modulator circuit, according to claim 11, with the impedance elements of at least one of said pairs of substantially equal series impedances comprising resistances.

16. In a balanced modulator circuit, a bridge comprising at least four rectifying elements disposed in respective arms thereof, a carrier wave source, input and output transformers having one winding each that is divided to provide connections from an intermediate point to said carrier wave source, each of said windings being connected to said bridge circuit, and means for balancing any pair of said bridge rectifying elments, comprising a plurality of additional rectifiers and a pair of voltage dividers, said voltage dividers being connected in parallel between the two winding divisions of one of said transformers, and said additional rectifiers being connected in series with the resistance elements of said voltage dividers in such a manner that only current in one direction flows in one of said voltage dividers and only current in the opposite direction flows in the other of said voltage dividers.

17. In a balanced modulator circuit, in accordance with claim 16, an additional voltage divider, connected so that said first pair of voltage dividers receive carrier current from said source through said additional voltage divider.

18. A balanced modulator comprising a bridge circuit having at least four asymmetrically conducting elements disposed in respective arms thereof, a wave input circuit and a wave output circuit connected to said bridge circuit, a source of carrier wave energy, circuit means connecting said source to said bridge circuit to supply carrier wave energy to said asymmetrically conducting bridge elements, said circuit means including a pair of rectifiers each poled to selectively transmit said carrier wave energy to a respective pair of said asymmetrically conducting bridge elements.

19. A balanced modulator, in accordance with claim 18, and means for adjusting the relative amounts of carrier wave energy transmitted to the members of at least one of said pairs of asymmetrically conducting bridge elements.

HERMAN T. CARTER.

REFERENCES CITED

The following references are of record in the file of this patent:

FOREIGN PATENTS

| Number | Country | Date |
|---|---|---|
| 435,201 | Great Britain | Feb. 1, 1935 |
| 482,241 | Great Britain | Mar. 25, 1938 |